US008564919B2

(12) United States Patent
Vanderzon

(10) Patent No.: US 8,564,919 B2
(45) Date of Patent: Oct. 22, 2013

(54) DIMMER CIRCUIT WITH OVERCURRENT DETECTION

(75) Inventor: James Robert Vanderzon, Adelaide (AU)

(73) Assignee: Clipsal Australia Pty Ltd, Baulkham Hills (AU)

( * ) Notice: Subject to any disclaimer, the term of this patent is extended or adjusted under 35 U.S.C. 154(b) by 516 days.

(21) Appl. No.: 12/678,598

(22) PCT Filed: Sep. 19, 2008

(86) PCT No.: PCT/AU2008/001399

§ 371 (c)(1), (2), (4) Date: Jun. 11, 2010

(87) PCT Pub. No.: WO2009/036516

PCT Pub. Date: Mar. 26, 2009

(65) Prior Publication Data

US 2010/0259855 A1 Oct. 14, 2010

(30) Foreign Application Priority Data

Sep. 19, 2007 (AU) ................................ 2007905108
Sep. 19, 2007 (AU) ................................ 2007905109
Sep. 19, 2007 (AU) ................................ 2007905110

(51) Int. Cl.

*H02H 3/08* (2006.01)
*H02H 9/02* (2006.01)
*H02H 5/04* (2006.01)

(52) U.S. Cl.

USPC ........................................ 361/93.1; 361/93.8

(58) Field of Classification Search

USPC ................................................ 361/93.1, 93.8
See application file for complete search history.

(56) References Cited

U.S. PATENT DOCUMENTS

| | | | | |
|---|---|---|---|---|
| 4,429,339 | A * | 1/1984 | Jaeschke et al. | 361/93.7 |
| 5,004,969 | A | 4/1991 | Schanin | |
| 2005/0259375 | A1 * | 11/2005 | Akimura et al. | 361/93.1 |
| 2006/0221528 | A1 * | 10/2006 | Li et al. | 361/100 |

FOREIGN PATENT DOCUMENTS

| | | | |
|---|---|---|---|
| EP | 1253809 | A2 | 10/2002 |
| WO | WO 03/081364 | A1 | 10/2003 |
| WO | WO 03/081961 | A1 | 10/2003 |
| WO | WO 03/081962 | A1 | 10/2003 |
| WO | WO 2007/068040 | A1 | 6/2007 |
| WO | WO 2007/068041 | A1 | 6/2007 |
| WO | WO 2007/068042 | A1 | 6/2007 |

OTHER PUBLICATIONS

PCT International Search Report for PCT/AU2008/001399, Applicant: Clipsal Australia PTY Ltd., et al., Form PCT/ISA/210 and 220, dated Dec. 9, 2008 (2 pages).
PCT Written Opinion of the International Search Authority for PCT/AU2008/001399, Applicant: Clipsal Australia PTY Ltd., et al., Form PCT/ISA/237, dated Dec. 9, 2008 (6 pages).

* cited by examiner

*Primary Examiner* — Dharti Patel
(74) *Attorney, Agent, or Firm* — Vista IP Law Group LLP

(57) ABSTRACT

Disclosed is a method and apparatus for detecting an overcurrent condition in a dimmer circuit having two switches, each for controlling power delivered to a load, each switch having a respective anti-parallel diode. The method comprises sensing a voltage drop across one of the anti-parallel diodes, comparing the sensed voltage drop with a reference voltage, and determining that an overcurrent condition exists if the sensed voltage drop exceeds the reference voltage. Also disclosed is a dimmer circuit embodying the method.

21 Claims, 7 Drawing Sheets

DIMMER CIRCUIT WITH OVERCURRENT DETECTION

PRIORITY

This application is a U.S. National Stage filing under 35 U.S.C. §371 of International Application No. PCT/AU2008/001399, filed 19 Sep. 2008, which claims priority of Australian Provisional Patent Application No. 2007905110, filed on 19 Sep. 2007, Australian Provisional Patent Application No. 2007905108, filed on 19 Sep. 2007 and Australian Provisional Patent Application No. 2007905109, filed on 19 Sep. 2007. The contents of the aforementioned applications are incorporated by reference as if set forth fully herein. Priority to the aforementioned application is hereby expressly claimed in accordance with 35 U.S.C. §§119, 120, 365 and 371 and any other applicable statutes.

The entire content of each of these applications is hereby incorporated by reference.

INCORPORATION BY REFERENCE

The following description refers to the following patent applications:

PCT/AU03/00365 entitled "Improved Dimmer Circuit Arrangement"; PCT/AU03/00366 entitled "Dimmer Circuit with Improved Inductive Load";

PCT/AU03/00364 entitled "Dimmer Circuit with Improved Ripple Control";

PCT/AU2006/001883 entitled "Current Zero Crossing Detector in A Dimmer Circuit";

PCT/AU2006/001882 entitled "Load Detector For A Dimmer";

PCT/AU2006/001881 entitled "A Universal Dimmer"; and

Co-pending Australian Provisional Patent Application entitled "Overcurrent Protection In A Dimmer Circuit".

The entire content of each of these patent applications is hereby incorporated by reference.

TECHNICAL FIELD

The present invention relates to dimmer circuits and in particular, to detecting overcurrent conditions.

BACKGROUND

Dimmer circuits are used to control the power provided to a load such as a light or electric motor from a power source such as mains power. Such circuits often use a technique referred to as phase controlled dimming. This allows power provided to the load to be controlled by varying the amount of time that a switch connecting the load to the power source is conducting during a given cycle.

For example, if voltage provided by the power source can be represented by a sine wave, then maximum power is provided to the load if the switch connecting the load to the power source is on at all times. In this way the, the total energy of the power source is transferred to the load. If the switch is turned off for a portion of each cycle (both positive and negative), then a proportional amount of the sine wave is effectively isolated from the load, thus reducing the average energy provided to the load. For example, if the switch is turned on and off half way through each cycle, then only half of the power will be transferred to the load. The overall effect will be, for example in the case of a light, a smooth dimming action resulting in the control of the luminosity of the light.

Since the load is connected to a high voltage or current source such as mains power, a defect in the circuit such as a short circuit, can lead to a sudden surge of high current, which can damage the load and any circuitry connected to the load. It is useful for the dimmer circuit to be able to detect the presence of such high, or overcurrent conditions, and act so as to remove the load and/or connected circuitry from the high current source.

A number of techniques exist which allow detection of overcurrent conditions within a dimmer circuit, however, these suffer from various drawbacks including added circuit complexity, excessive power dissipation or lack of robustness.

A typical MOSFET or IGBT based phase-control dimmer circuit comprises two devices connected in an opposing polarity series arrangement, to facilitate the conduction of alternating current through a series connected load. For a given line voltage polarity, only one device is responsible for determining the flow of load current, since the anti-parallel diode associated with the remaining device will be forward biased during this polarity.

One commonly-used technique for fault or overcurrent sensing uses a fixed resistance arrangement as shown in FIG. 1. A fixed resistance (R1 & R2) is placed in series with "common" output terminal of one or both switching devices (IGBT1 and IGBT2, with corresponding co-packed anti-parallel diodes D1 and D2). Voltage comparators (not shown) are used to sense the voltage developed across the resistor(s) arising due to the flow of load current. The appropriate switching device is turned off at the instant when a predetermined current threshold is exceeded.

The main disadvantage of this technique is that the current sense resistor(s) must be sufficiently robust to withstand high peak currents. There is also a power loss associated with the resistance during normal dimmer operation.

Another known technique is to use MOSFET conduction voltage sensing as shown in FIG. 2. In this arrangement, the switches (in this example MOSFET1 and MOSFET2, with corresponding intrinsic anti-parallel diodes D1 and D2), exhibit a resistive V/I characteristic when the gate drive magnitude is fully established. The on-state conduction voltage (Vds) of MOSFET is directly proportional to load current magnitude (notwithstanding variation due to temperature). This can therefore be monitored as a means to detect excessive load current magnitude.

A significant disadvantage of this technique however, is that during MOSFET turn-on or turn-off transition—where gate voltage is traversing the gate threshold voltage region, the device does not exhibit a resistive V/I characteristic. Therefore the method of monitoring Vds magnitude is not applicable during such time, thus negating ability to detect associated overcurrent events.

SUMMARY

A method of detecting an overcurrent condition in a dimmer circuit for controlling power delivered to a load, the dimmer circuit having a first switch for controlling the power to the load in a first polarity, the first switch having a first anti-parallel diode, and a second switch for controlling power to the load in a second polarity, the second switch having a second anti-parallel diode, the method comprising:

- sensing a voltage drop across one of the first or second anti-parallel diodes, whichever is associated with a non-controlling one of the first switch or the second switch;
- comparing the sensed voltage drop with a reference voltage; and determining that there is an overcurrent condition when the sensed voltage drop exceeds the reference voltage.

In one form, the first switch and the second switch are MOSFETs.

In this form, the first and second anti-parallel diodes are intrinsic diodes.

In another form, the first and second switches are IGBTs.

In this form, the first and second anti-parallel diodes are co-packed.

In one form, the method further comprises activating a latch circuit to remove gate drive to the first and/or second switches to prevent or reduce damage from the overcurrent condition.

According to another aspect of the present invention, there is provided a detector circuit for detecting an overcurrent condition in a dimmer circuit for controlling power delivered to a load, the dimmer circuit having a first switch for controlling power to the load in a first polarity, the first switch having a first anti-parallel diode, and a second switch for controlling power to the load in a second polarity, the second switch having a second anti-parallel diode, the detector circuit comprising:

means for applying to a comparator, a signal representative of a voltage drop across one of the first or second anti-parallel diodes, whichever is associated with a non-controlling one of the first switch or the second switch; and the comparator for comparing the applied signal with a reference voltage.

In one form, the comparator is a transistor.

According to another aspect of the present invention, there is provided a dimmer circuit for controlling power delivered to a load, the dimmer circuit comprising:

a first switch for controlling the power to the load in a first polarity, the first switch having a first anti-parallel diode;

a second switch for controlling power to the load in a second polarity, the second switch having a second anti-parallel diode;

a detector circuit comprising:

means for applying to a comparator, a signal representative of a voltage drop across one of the first or second anti-parallel diodes, whichever is associated with a non-controlling one of the first switch or the second switch; and the comparator for comparing the applied signal with a reference voltage; and means for disconnecting the load from the power if the applied signal is greater than the reference voltage.

BRIEF DESCRIPTION OF THE DRAWINGS

Various aspects of the preset invention will be described in detail with reference to the following figures in which.

DETAILED DESCRIPTION

Figure 3:
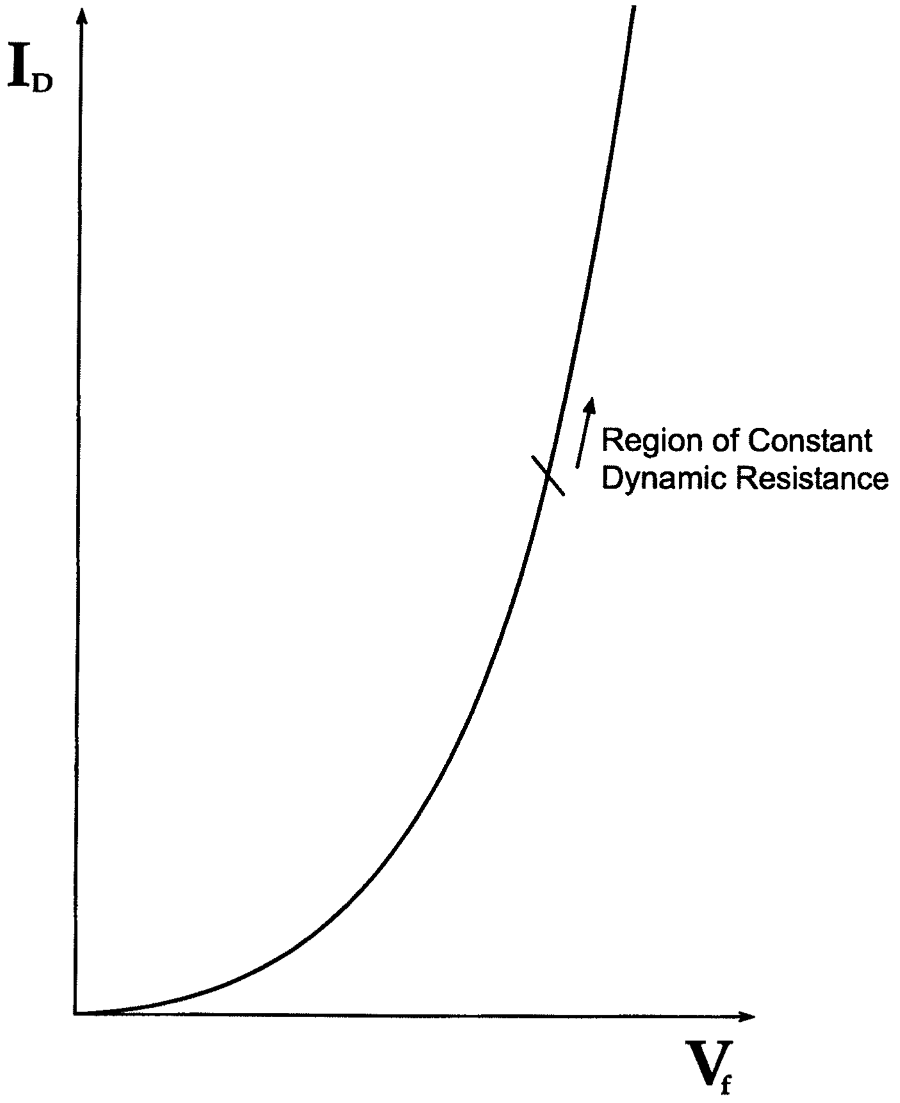
FIG. 3—shows an ID/VF characteristic curve for a transistor diode used in an aspect of the present invention.

FIG. 3 shows the V/I characteristic for a diode, with the current $I_D$ passing through the diode on the vertical axis and the forward voltage of the diode $V_F$ on the horizontal axis. As can be seen, at low currents (for example less than 3 Amps), the curve is exponential. Thus, diodes are generally unsuitable for use in current sensing. However, it has been realized that at high currents (for example greater than 30 Amps), which occur in overcurrent conditions, the curve becomes substantially linear, and thus more useful as a current sensing device, contrary to its normal use.

Figure 4:
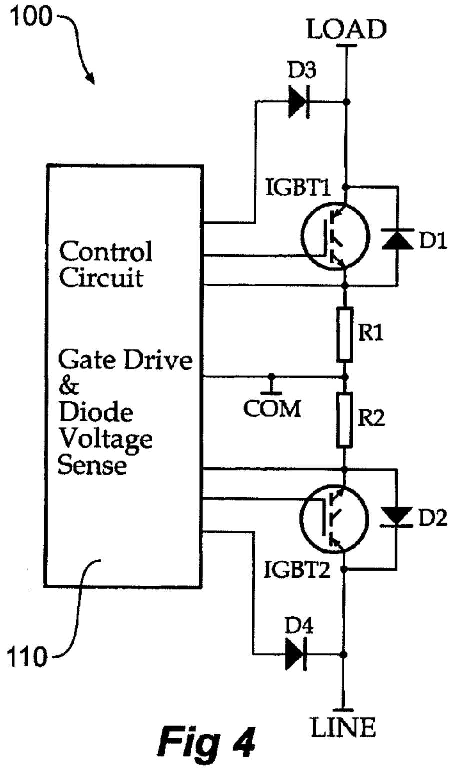
FIG. 4—shows a circuit arrangement according to an aspect of the present invention.

FIG. 4 shows a general arrangement of a circuit for use with an aspect of the present invention. Shown there is a dimmer circuit 100 including control circuit, gate-drive and diode voltage sensing block 110, with switches IGBT1 and IGBT2, with associated anti-parallel diodes D1 and D2. The voltage drop across the forward-biased anti-parallel diode (D1 & D2) associated with the non-controlling device can be monitored as a means to determine overcurrent events. Diodes D3 and D4 in FIG. 4 are high-voltage coupling diodes used to provide rectification of the ac signal appearing across respective switching devices IGBT1 and IGBT2, and do not form part of the current sensing means.

Figure 1:
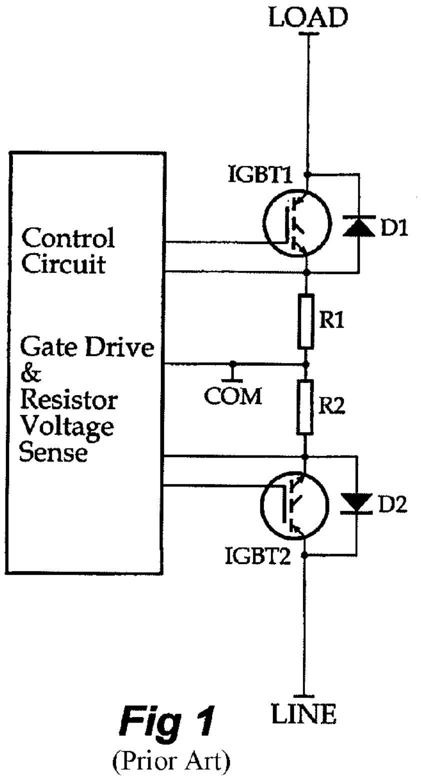
Fig 1 (Prior Art)
FIG. 1—shows a prior art arrangement of current sensing using series resistors.
Figure 2:
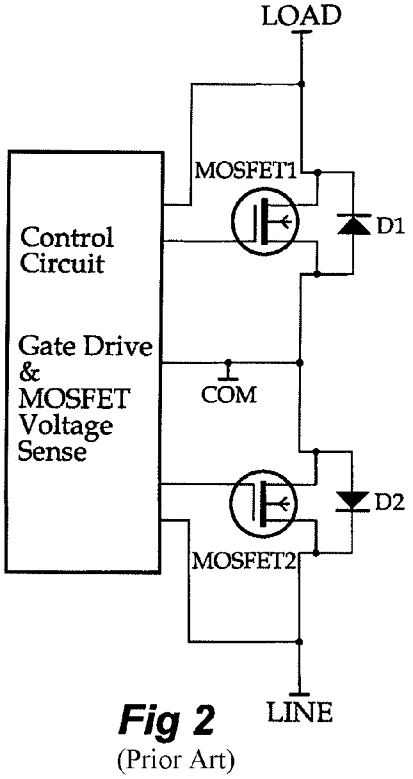
Fig 2 (Prior Art)
FIG. 2—shows another prior art arrangement of current sensing using MOSFET conduction voltage sensing.
Figure 5:
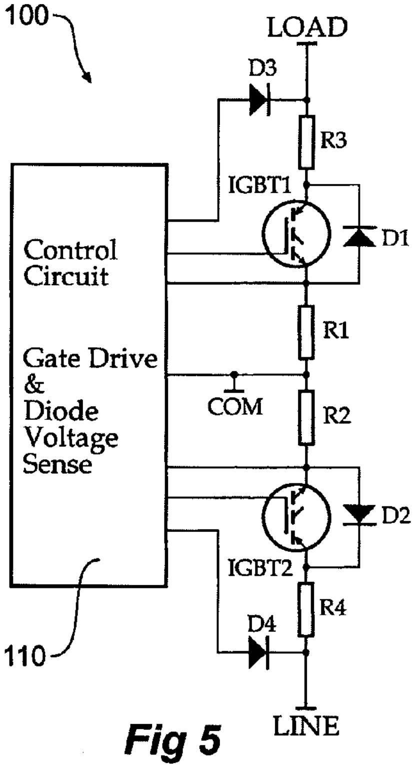
FIG. 5—shows an alternative circuit arrangement of FIG. 4.

While the arrangement shown in FIG. 4 avoids the requirement for separate current sense resistors as required in prior art FIG. 1, it is however, possible to complement the technique by the introduction of additional resistance of reduced value, as shown in FIG. 5. In this figure, resistors R1, R2, R3 and R4 can be placed in series with either output terminal of the switching device, thus permitting exploitation of unavoidable resistance associated with the conductors in the load current conduction path. Such arrangement is of course only one optional arrangement.

It will be understood that where the switches have been implemented as IGBTs or MOSFETs, they could equally be implemented as the other.

It will also be understood that in any application of the present invention, there may be used other switching devices such as bi-polar transistors, and separate anti-parallel diodes may be connected as required and used in this application. Similarly, in the case of IGBTs that do not have co-packed anti-parallel diodes, suitable diodes can be connected for use with this invention.

The operation of the circuit according to one aspect of the present invention will now be described in general terms.

In a given mains voltage half-cycle polarity, the voltage appearing across the anti-parallel diode associated with the non-controlling power switching device of a dimmer is compared with a reference voltage to activate a latch circuit to immediately remove gate drive from the power devices in order to provide protection from device failure due to excessive current magnitude when the dimmer is subjected to high fault current conditions.

As previously described, a sense voltage signal derived from each power device anti-parallel diode exhibits an exponential V/I characteristic at low to medium current levels, but gradually changes to a predominantly proportional V/I characteristic at high current levels. This can be interpreted to be more or less representative of the dimmer load current at the higher current levels. Thus in this aspect, the inherent additional resistance associated with the physical current path, for both input and output terminals of the power devices in a practical circuit layout, can be utilized as part of the current sense signal method.

In one form, high-voltage diodes are used to block mains high voltage levels and couple the power device diode sense voltage to the low voltage sensing circuitry. The coupled sense voltages may be electrically combined to form one signal, or processed as individual signals. The sense voltage is filtered to minimize susceptibility of the detection circuitry to electrical disturbance signals. The filter does not however impede the time response of the fault current detection process.

In one form, a resistive divider circuit arrangement is used to voltage shift the originating negative polarity diode sense voltage to one that is positive with respect to the control circuit zero reference potential. Alternatively a constant current source circuit with series resistor could be used to provide the necessary level shift function.

A comparator circuit with a pre-determined reference voltage—exceeding in magnitude the exponential voltage region of the sense signal characteristic, effectively functions within the linear region of the sense signals. A latch circuit for removing gate drive to the power devices is triggered by the comparator when the sense signal voltage exceeds the pre-determined reference level.

Figure 6:
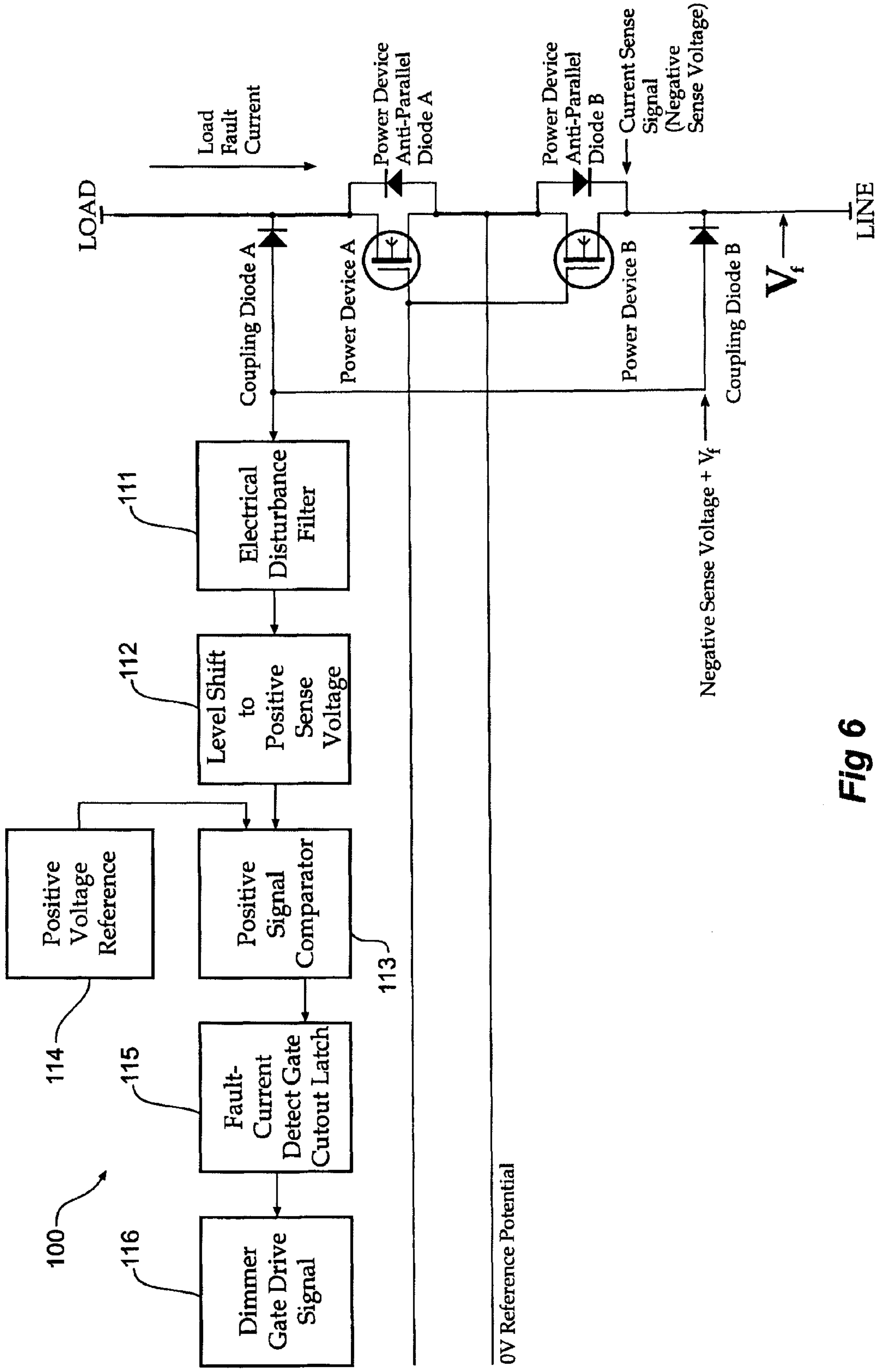
FIG. 6—shows an exemplary dimmer circuit using the circuit arrangement of FIG. 4.

FIG. 6 is a block diagram of the main elements of one arrangement as described above Dimmer circuit 100 includes an AC switch circuit—comprising in this example, first and second switches, being in this example, two series connected power MOSFETs A and B, with corresponding intrinsic anti-parallel diodes, diode A and diode B. Also shown are current sense signal coupling/blocking diodes C and D, associated with each MOSFET.

An electrical disturbance filter 111 is provided to prevent transient dimmer voltages from inadvertently triggering a fault cutout latch. It will be understood that this block is not required for the performance of the invention, but simply provides an optional additional feature.

A level shift to positive sense voltage block 112 is provided to level shift the sense voltage relative to 0V reference level since the originating current sense signal voltage is negative relative to 0V reference level.

A comparator 113 is provided to determine if the level shifted current sense signal voltage has exceeded a pre-determined reference voltage, hence the equivalent current threshold. The positive reference voltage is provided by block 114.

A fault cutout latch 115 is provided to cause cutoff of drive to load control power devices.

Block 116 represents the standard circuitry in a conventional dimmer control circuit that is responsible for generation of gate drive signals to the power devices as will be understood by the person skilled in the art. Examples of dimmer circuit arrangements with additional features which may also be used in conjunction with the various arrangements of the present invention include those described in: PCT/AU03/00365 entitled “Improved Dimmer Circuit Arrangement”, PCT/AU03/00366 entitled “Dimmer Circuit with Improved Inductive Load”, PCT/AU03/00364 entitled “Dimmer Circuit with Improved Ripple Control”, PCT/AU2006/001883 entitled “Current Zero Crossing Detector in A Dimmer Circuit”, PCT/AU2006/001882 entitled “Load Detector For A Dimmer” and PCT/AU2006/001881 entitled “A Universal Dimmer”, the entire contents of each of which is hereby incorporated by reference.

Blocks 111 to 116 make up block 110 in FIGS. 4 and 5.

Figure 7:
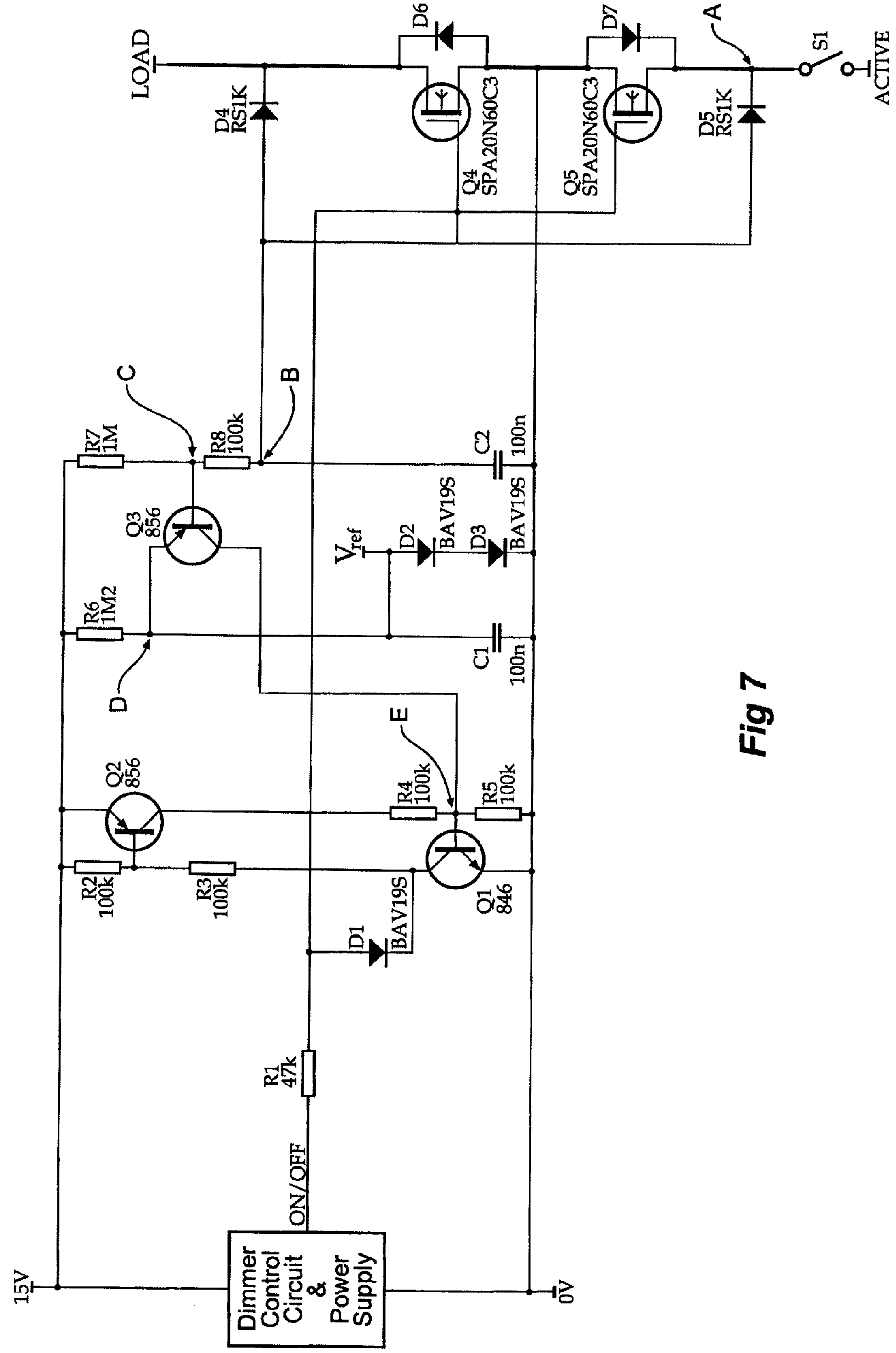
FIG. 7—shows an exemplary circuit diagram for the arrangement of FIG. 6.

FIG. 7 shows an exemplary circuit diagram for the block diagram of FIG. 6.

The reference voltage block 114 in FIG. 6 is provided by resistor R6 to provide a near constant current, of approximately 12 uA. Resistor R6 is connected to series connected diodes D2 & D3, establishing reference voltage Vref.

The diode junction is used to establish the reference voltage to provide temperature compensation for thermally dependent forward bias voltage drop associated with comparator transistor and coupling diodes, hence stabilizing the effective fault current detection threshold.

Capacitor C1 performs a charge reservoir function to provide increased peak latch trigger current, for rapid response when an instantaneous dimmer fault current condition occurs.

High-voltage coupling diodes D4 & D5 provide rectification of the ac signal appearing across respective power devices Q4 & Q5, allowing only the negative-going voltage signal component—corresponding to power device diode forward conduction, to be coupled into the sensing circuit and blocking the high positive voltage levels appearing across the power devices.

Bias currents are provided by series resistors R7 & R8 for the coupling diodes, resulting in alternate negative sense voltages appearing at each diode anode, corresponding to each polarity of load current (the Sense Signal Coupling & Level Shift block 112 in FIG. 6). Since the 15V rail is large in comparison to sense voltage amplitude, and that the ratios of R7/R8 is relatively large, the current in R7 is therefore nearly constant, hence any change in sense voltages appearing at D4 or D5 anodes causes almost identical changes in the positive bias voltages appearing at the junction of R7 & R8.

Capacitor C2 performs a filtering function (block 111 in FIG. 6) to provide attenuation of disturbance signal voltage resulting from power switching device voltage transients injecting current through junction capacitance of the high-voltage coupling diodes.

The Comparator 113 of FIG. 6 is provided by transistor Q3, with emitter connected to reference voltage Vref. The base input is driven by level shifted sense voltage at the junction of R7 & R8. Under normal dimmer load operating conditions the sense voltage is approximately up to 0.2V more positive than Vref. Hence the comparator transistors remain non-conducting. Under high current fault conditions the sense voltage is pulled sufficiently negative such as to bias Q3 into conduction. This then triggers the operation of cutout latch 115.

Cutout Latch 115 is provided by transistors Q1 & Q2, which are configured as a latch circuit, with input drive signal to Q1 base. Diode D1 permits gate signal to be pulled low at latch condition and prevents Q2 from being driven under normal conditions when the gate is low.

The operation of the overcurrent cutout mechanism will now be described with reference to FIG. 7, for the condition when load terminal is positive compared to line terminal, as follows:

The event of a high magnitude fault current flowing through Q4 & Q5 results in a negative voltage of approximately −1.5V, appearing at D5 cathode, as a result of a substantial portion of the total fault current directed through the Q5 anti-parallel diode i.e. D7. The MOSFET channel on-state resistance is not sufficiently low to conduct high current levels whilst maintaining low corresponding voltage drop, hence current flows through the diode.

The corresponding bias voltage at D5 anode is then −1.1V, based on a nominal forward bias potential of 0.4V at a low conduction current of approx. 10 μA for diode D5.

The corresponding level shifted bias voltage at base of Q3 is then +0.36V, hence Q3 is driven into conduction. Series connected voltage reference diodes D2 & D3 provide temperature compensation for transistor Q3 operating Vbe potential and diode D5 operating forward bias potential. Collector current from Q3 results in Q1 conduction through diode D1 to immediately remove gate drive voltage from power devices Q4 & Q5, resulting in termination of dimmer conduction.

Activation of Q1 also provides base drive for Q2 via R3, which in turn supplements base drive for Q1 via R4, resulting in a latch condition.

FIGS. 8A to 8F show the various waveforms at points in the circuit of FIG. 7, at the various stages of operation as described above.

Figures 8A, 8B, 8C, 8D, 8E, 8F:
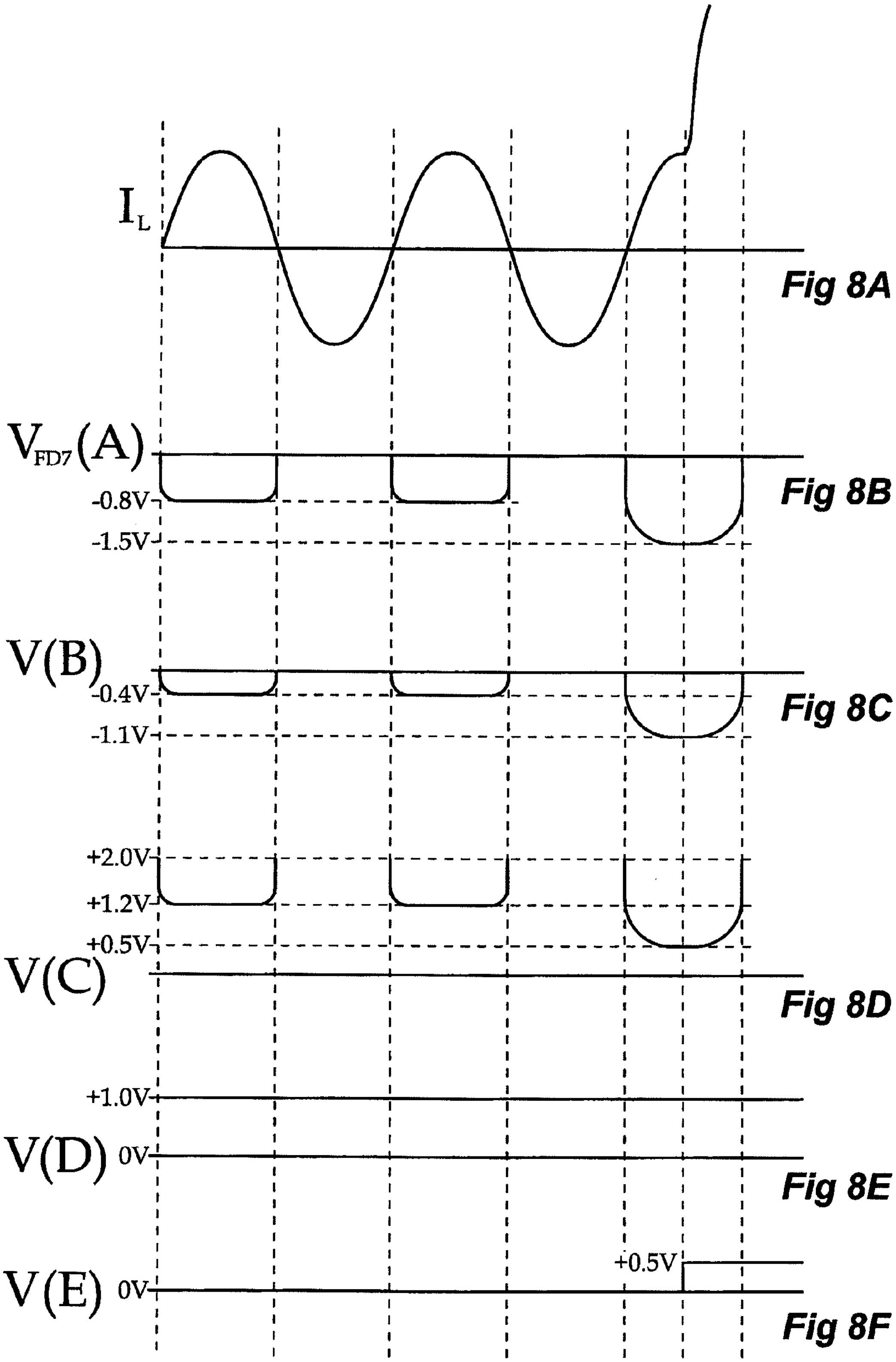
FIGS. 8A to 8F—show various waveforms in the circuit of FIG. 7, FIG. 9—shows a flowchart of a method of detecting an overcurrent condition in a dimmer circuit according to one aspect of the present invention.

FIG. 8A shows the load current $I_L$ over several cycles of the mains power. An exemplary value of the current is +/−3 A. As it enters the third cycle in this example, a fault occurs, leading to an overcurrent condition, causing $I_L$ to rapidly increase to a much higher value, for example in excess of 30 A.

FIG. 8B shows the waveform of the forward voltage drop $V_{FD7}$ of diode D7, at point A. In this case, switch Q4 is the controlling switch, and switch Q5 having intrinsic diode D7 is the non-controlling switch. The value of $V_{FD7}$ at point A during normal operating conditions will be about −0.8V. When the fault occurs, the value of $V_{FD7}$ at point A is about −1.5V FIG. 8C shows the waveform of point B, on the other side of diode D5. Under normal operating conditions, it is about −0.4V and then shoots down to about −1.1V at 30 A.

FIG. 8D shows the waveform at point C, at the gate of transistor Q3. Because of the substantially constant current source provided by R7 as previously described, the voltage drop across R8 will be substantially constant at 1.6V (with a rail voltage of about 15V as shown in FIG. 7). Thus under normal operating conditions, the voltage at point C will range from no greater than about +2V down to about +1.2V over a particular half cycle. At fault conditions, this will drop down to about +0.5V at the peak of the half cycle as shown.

FIG. 8E shows the voltage at point D, which is the emitter terminal of transistor Q3, acting in this case as the comparator. The voltage at point D will be a substantially constant value of +1.0V.

FIG. 8F shows the voltage at point E, the input to latch circuit 115 (FIG. 6). Under normal operation, the value at point E is substantially 0V. When the fault condition occurs, and the voltage at the input to comparator/transistor Q3 goes below 1.0V, the input to latch circuit 115 at point E suddenly rises to about 0.5V. This impulse acts as a trigger to actuate latch circuit 115 to disconnect gate drive to the switches Q4 and Q5, thereby preventing or reducing the likelihood of damage to the load and circuitry due to the fault causing the overcurrent conditions.

It will be appreciated that the various aspects of the present invention are not limited to actually disconnecting the gate drive from the switches. The example given above merely illustrates this as one application. The aspects of the invention relating to sensing the overcurrent conditions need not be used in a circuit breaker application but may be used for any other purpose where knowledge of a fault condition is required, such as in a fault analysis system.

Figure 9:
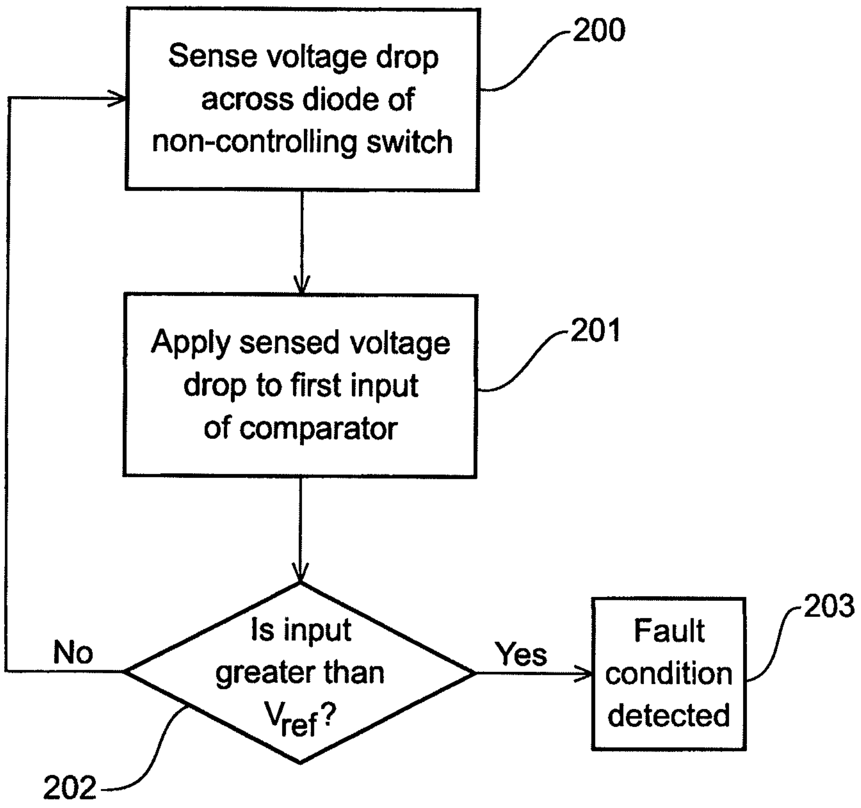

FIG. 9 is a flowchart of a method according to one aspect of the present invention. At step 200, the voltage across the anti-parallel diode of the non-controlling switch is sensed. In step 201, this sensed voltage is applied to an input of a comparator. In step 202, this input is compared with a reference voltage. If the input voltage is less than or equal to the reference voltage, no fault or overcurrent condition is detected and the method returns to step 200 to continue monitoring for fault or overcurrent conditions. If the input voltage is greater than the reference voltage, it is determined that a fault or overcurrent condition is present, at step 203.

Figure 10:
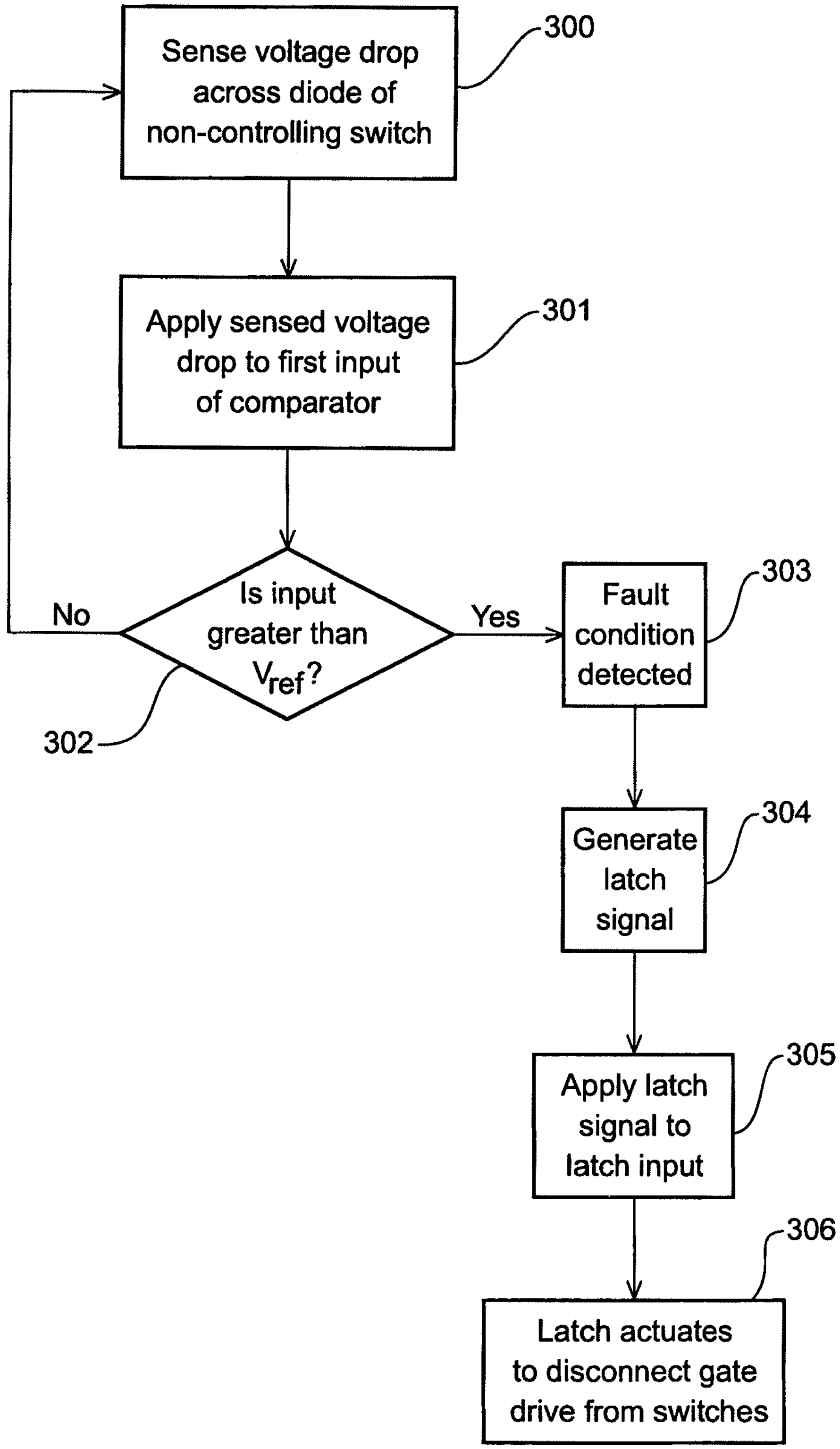
FIG. 10—shows a flowchart of a method of protecting a dimmer circuit from an overcurrent condition according to an aspect of the present invention.

As previously described, this information can be used in a number of applications. In one application, the information is used as a circuit breaker to remove the overcurrent source from the load and dimmer circuit. FIG. 10 shows the method steps in this particular application. At step 300, the voltage across the anti-parallel diode of the non-controlling switch is sensed. In step 301, this sensed voltage is applied to an input of a comparator. In step 302, this input is compared with a reference voltage. If the input voltage is less than or equal to the reference voltage, no fault or overcurrent condition is detected and the method returns to step 300 to continue monitoring for fault or overcurrent conditions. If the input voltage is greater than the reference voltage, it is determined that a fault or overcurrent condition exists, at step 303.

In this particular application, if a fault or overcurrent condition is detected, or determined to exist, the information is used to disconnect the load and circuitry from the source of overcurrent to prevent or reduce the risk of damage. In this particular example, the signal provided by the method of FIG. 9 indicating a fault or overcurrent condition is generated as a latch signal in step 304, and then applied to the input of the latch at step 305. This then results in the actuation of the latch in step 306, resulting in the disconnection of the gate drive to the switches.

It will be appreciated by those skilled in the art that the invention is not restricted in its use to the particular application described. Neither is the present invention restricted in its preferred embodiment with regard to the particular elements and/or features described or depicted herein. It will be appreciated that various modifications can be made without departing from the principles of the invention. Therefore, the invention should be understood to include all such modifications in its scope.

For example, the various aspects of the present invention may be applied to any controllable switches, including bipolar transistors, and is also applicable to use with diodes that are separately connected with the switch.

Throughout the specification and the claims that follow, unless the context requires otherwise, the words “comprise” and “include” and variations such as “comprising” and “including” will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

The invention claimed is:

1. A method of detecting an overcurrent condition in a dimmer circuit for controlling power delivered to a load, the dimmer circuit having a first switch for controlling the power to the load in a first polarity, the first switch having a first anti-parallel diode, and a second switch for controlling power to the load in a second polarity, the second switch having a second anti-parallel diode, the method comprising:

sensing a voltage drop across one of the first or second anti-parallel diodes, whichever is associated with a non-controlling one of the first switch or the second switch;

comparing the sensed voltage drop with a reference voltage using a transistor, wherein the reference voltage is temperature compensated to compensate for thermally dependent forward bias voltage drop associated with the transistor and the first or second anti-parallel diodes; and determining that there is an overcurrent condition when the sensed voltage drop exceeds the reference voltage.

2. The method as claimed in claim 1 wherein the first switch and the second switch are MOSFETs.

3. The method as claimed in claim 2 wherein the first and second anti-parallel diodes are intrinsic diodes.

4. The method as claimed in claim 1 wherein the first and second switches are IGBTs.

5. The method as claimed in claim 4 wherein the first and second anti-parallel diodes are co-packed.

6. The dimmer circuit as claimed in claim 4 wherein the first and second anti-parallel diodes are co-packed.

7. The method as claimed in claim 1 further comprising activating a latch circuit to remove gate drive to the first and/or second switches to prevent or reduce damage from the detected overcurrent condition.

8. The method as claimed in claim 1, wherein the temperature compensation is provided by one or more diodes connected in series.

9. The method as claimed in claim 1 wherein the reference voltage is a positive voltage and the method further comprises level shifting the sensed voltage drop relative to a 0V reference.

10. A detector circuit for detecting an overcurrent condition in a dimmer circuit for controlling power delivered to a load, the dimmer circuit having a first switch for controlling power to the load in a first polarity, the first switch having a first anti-parallel diode, and a second switch for controlling power to the load in a second polarity, the second switch having a second anti-parallel diode, the detector circuit comprising:

a diode voltage sensing module for generating a signal representative of a voltage drop across one of the first or second anti-parallel diodes, whichever is associated with a non-controlling one of the first switch or the second switch; and a transistor for comparing the signal generated by the diode sensing voltage module with a reference voltage, wherein the reference voltage is temperature compensated to compensate for thermally dependent forward bias voltage drop associated with the transistor and the first or second anti-parallel diodes.

11. The detector circuit as claimed in claim 10 wherein the temperature compensation is provided by one or more diodes connected in series.

12. The dimmer circuit as claimed in claim 10, wherein the a diode voltage sensing module further comprises a level shift circuit arrangement, and the generated signal representative of the voltage drop across one of the first or second anti-parallel diodes is a level shifted signal with respect to a zero reference potential.

13. The dimmer circuit as claimed in claim 12, wherein the level shifter comprises a resistive divider circuit arrangement which voltage receives a negative polarity diode sense voltage signal from the one of the first or second anti-parallel diodes and shifts the received voltage signal to a positive voltage signal with respect to the zero reference potential of the dimmer circuit.

14. A dimmer circuit for controlling power delivered to a load, the dimmer circuit comprising:

a first switch for controlling the power to the load in a first polarity, the first switch having a first anti-parallel diode;

a second switch for controlling power to the load in a second polarity, the second switch having a second anti-parallel diode;

a detector circuit comprising:

a diode voltage sensing module for generating a signal representative of a voltage drop across one of the first or second anti-parallel diodes, whichever is associated with a non-controlling one of the first switch or the second switch; and a transistor for comparing the applied signal with a reference voltage, wherein the reference voltage is temperature compensated to compensate for thermally dependent forward bias voltage drop associated with the transistor and the first or second anti-parallel diodes; and a fault cut-out module for disconnecting the load from the power if the applied signal is greater than the reference voltage.

15. The dimmer circuit as claimed in claim 14 wherein the first switch and the second switch are MOSFETs.

16. The dimmer circuit as claimed in claim 15 wherein the first and second anti-parallel diodes are intrinsic diodes.

17. The dimmer circuit as claimed in claim 14 wherein the first and second switches are IGBTs.

18. The dimmer circuit as claimed in claim 14 wherein the fault cut-out module is a latch.

19. The dimmer circuit as claimed in claim 14 wherein the temperature compensation is provided by one or more diodes connected in series.

20. The dimmer circuit as claimed in claim 14, wherein the a diode voltage sensing module further comprises a level shift circuit arrangement, and the generated signal representative of the voltage drop across one of the first or second anti-parallel diodes is a level shifted signal with respect to a zero reference potential.

21. The dimmer circuit as claimed in claim 20, wherein the level shifter comprises a resistive divider circuit arrangement which voltage receives a negative polarity diode sense voltage signal from the one of the first or second anti-parallel diodes and shifts the received voltage signal to a positive voltage signal with respect to the zero reference potential of the dimmer circuit.

* * * * *